Sept. 29, 1931.  N. DEISCH  1,825,340
ELECTROOPTIC CELL
Filed June 15, 1927   2 Sheets-Sheet 1

INVENTOR.
Noel Deisch.
BY Lewis H. Barnes.
ATTORNEY.

Sept. 29, 1931.  N. DEISCH  1,825,340
ELECTROOPTIC CELL
Filed June 15, 1927  2 Sheets-Sheet 2

Patented Sept. 29, 1931

1,825,340

UNITED STATES PATENT OFFICE

NOEL DEISCH, OF WASHINGTON, DISTRICT OF COLUMBIA

ELECTROOPTIC CELL

Application filed June 15, 1927. Serial No. 199,098.

The present invention relates to electro-optic cells, and particularly to that type of electro-optic cell in which application is made of the Kerr effect (the birefringence of dielectrics subjected to electrostatic strain) and has specific reference to the use of the cell for the purpose of electrically modulating a beam of light.

The primary object of the invention is to provide an electro-optic cell which combines high sensitivity to impressed differences of potential with the capacity to accommodate a beam of light of large cross-section.

Another object of the invention is to provide a construction of cell in which the active space is divided into a plurality of adjacent segments.

A third object of the invention is to provide in an electro-optic cell a substantial and practical multiple electrode construction.

It is known that the electro-optic cell has great inherent merits as a relay for electrically modulating a beam of light, in that its almost instantaneous response makes possible the very rapid reception of current impulses or modulations without sensible distortion. With the construction of cell heretofore employed, however, the potential difference that must be applied between the electrodes of the cell to obtain a difference of phase of one-half wave-length (corresponding to a change from full transmission to full extinction, or vice versa, of the incident monochromatic beam) is inconveniently high when the electrodes are separated sufficiently to allow of an adequate transmission of light. In the present invention this disadvantage is overcome through a novel disposition of parts of the cell, whose purpose and functioning will become apparent from considerations now developed.

The magnitude of the Kerr effect may be expressed by the formula $d\lambda = K\ F^2\ 1$, in which $d\lambda$ represents the phase difference in $m\mu$, K, the Kerr constant of the dielectric, F, the field in volts per centimeter, and 1, the light path through the strained dielectric in centimeters. It is evident from the above expression that the factor of field intensity exerts an exponential influence on the magnitude of the induced birefringence, and that a high degree of sensitivity will be most readily produced by a close approximation of the electrodes. On the other hand, the width of the electrodes, that is, their dimension along the axis of the light beam (1 in the formula) must also be taken into account in determining on the dimensions of a practical cell. If the dimensional characteristics of a cell designed to meet average requirements as respects sensitivity be computed, it will be found that, with the construction of cell heretofore used, the active space takes the form of a relatively narrow and deep slit, through which it is difficult to secure a satisfactory transmission of light. In the present cell the active space is divided into a number of closely contiguous slits or passages by means of a doubly intermeshing grating, this last comprising a system of parallel division members taking the form of blades or filaments constituting electrodes, each of which is insulated from its alternate.

Effectively, this construction constitutes a composite electro-optic cell in which a large number of similarly oriented cells are grouped in close contiguity, the breadth of beam that may be accommodated being equal to the sum of the widths of the component cells.

To avoid an undue loss of light through the blocking of the beam by the electrode blades or elements, it is desirable that their aggregate projected area along the optical axis be kept at as low a figure as possible, and for the same reason it is important that these several blades lie truly flat and parallel. These conditions are preferably met by constituting the electrodes of thin metal strips held taut in a stiff frame, their proper separation being insured by means of insulating guides. As a suitable material for the blades, rolled and polished steel or nickel tape about 0.003 of an inch thick, and about one-eighth to one-fourth inch wide, for a free cell aperture of one inch, is indicated.

Referring to the drawings.

Figure 1:
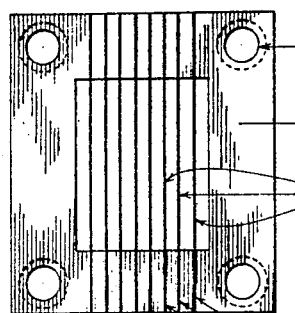
Fig. 1 is an inner face view of one of the two complementary composite electrodes, the several electrode blades or grating elements appearing in edge view.
Figure 2:
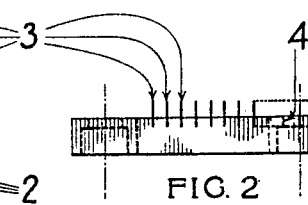
Fig. 2 is an end view of Fig. 1, the line of sight being along the principal axes of the grating elements.
Figure 3:
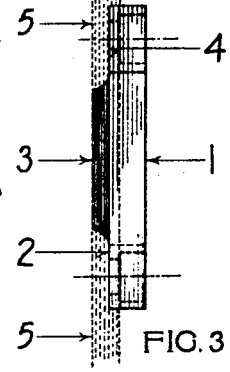
Fig. 3 is a side view of Fig. 1, showing in addition portions of the blades that are removed during manufacture and fitting.

In the design now considered the composite electrode elements, of which there are two, consist each of a solid metal frame 1, whose either end bears slots at regular intervals, at the positions 2, to accommodate and hold the end portions of the several electrode blades 3. The ribbon from which these blades are formed is put under tension when inserted into the frame, and is held under tension until the solder used to hold it in the slots at 2 has seized. The superfluous portions of ribbon, shown as a dotted band at 5 in Fig. 3, are then removed.

Figure 4:
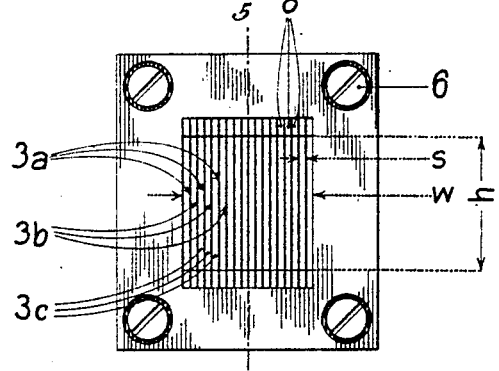
Fig. 4 is a face view of an assembly of an electrode similar to that shown in Fig. 1 with its complementary electrode.
Figure 5:
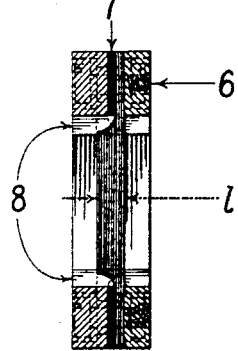
Fig. 5 is a section on the line 5—5 of Fig. 4.

Two such composite electrodes, differing only in that the two series of slots and their contained electrodes are displaced laterally with respect to each other by one-half of a slot width, are brought together in assembling the cell so that the electrodes mutually interpenetrate, the blades of the one set fitting into the interspaces of the other, as shown in Fig. 4, wherein the blades 3a belong to the one electrode and the blades 3b belong to the complementary electrode. Parallelism of the blades is ensured by inserting between them insulating strips 8, of a thickness substantially equal to the spacing interval minus the thickness of the condenser blades. These strips may be of mica or of glass, or other suitable insulating material. An insulating separator 7 extends as a rectangular ring entirely about and lies between the two frames, which last are permanently clamped together by screw-bolts 6, extending through insulating bushings which lie in the holes. It is obvious that each of the light-passages 3c Fig. 4 is bounded by electrodes of opposite polarity, and when filled with a suitable dielectric constitutes an electro-optic cell; the entire assembly as shown in Fig. 4 may therefore be regarded as a composite electro-optic cell.

The assembled compound electrode is immersed in an appropriate dielectric fluid, such as nitrobenzol contained in a cell provided with optically worked glass windows, the particular construction of which is well known and does not form a part of the present invention. The two composite electrodes are of course by appropriate leads connected across the circuit in which the incoming or governing electric impulses are active.

Figure 6:
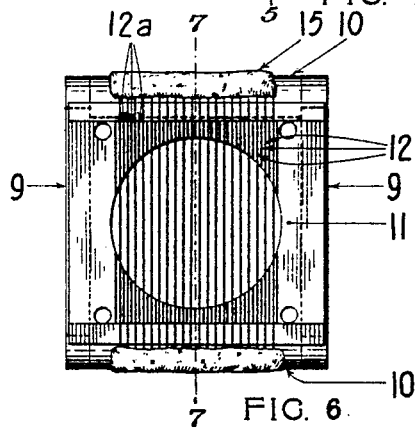
Fig. 6 is an inner face view of an alternative construction of one of the composite electrodes, in which the grating elements are constituted of wires.
Figure 7:
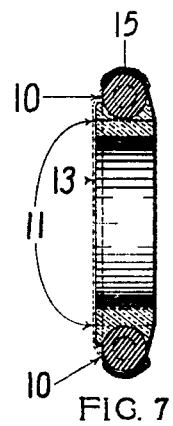
Fig. 7 is a section on the line 7—7 of Fig. 6.
Figure 8:
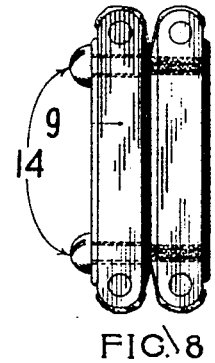
Fig. 8 is a side view of an assembly of an electrode similar to that shown in Fig. 6 with its complementary electrode.

When it is desired to modulate a markedly convergent or divergent or diffuse light beam, or in general a beam that does not approach parallelism, it is advantageous to reduce the dimension of the electrode blades to a small value. To meet this special case a construction in which the electrodes consist of wires of very small diameter, closely spaced, may be used. The arrangement preferred is shown in Figures 6, 7 and 8, where a metal frame consisting of two side supports 9, and the cylindrical spacers 10, holds an insulating wire-support 11, which last may consist of natural or synthetic resin cast onto the frame. This support bears on its upper face equally spaced grooves at 12 of a depth not greater than half the diameter of the wire forming the electrodes. In constructing the composite electrode proper, wire is wound tightly over the frame spacers and the insulating support, each succeeding turn passing down a groove in the support and leaving a vacant groove between itself and the preceding convolution, as indicated at 12a. On the winding being completed, those parts of the wires passing over the metal spacers are brazed or soldered or otherwise affixed thereto, as shown at 15, and the portions of the wire shown in dotted lines at 13 are cut away. The two composite electrodes are then assembled in face-to-face relation, as shown in Fig. 8, the grating wires of the one electrode lying in the interspaces of the grating wires of the second electrode. The two are held firmly together by means of screws 14, which engage threads in one of the insulating supports, as shown.

Figure 9:
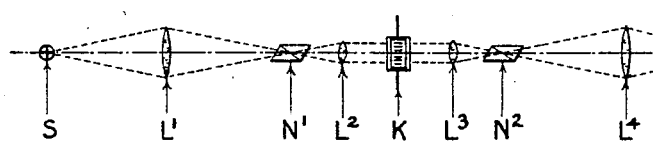
Fig. 9 is a diagram of an optical system in which a beam of light is modulated and recorded, of which the construction shown in Fig. 4 or Fig. 8 may form a part.
Figure 10:
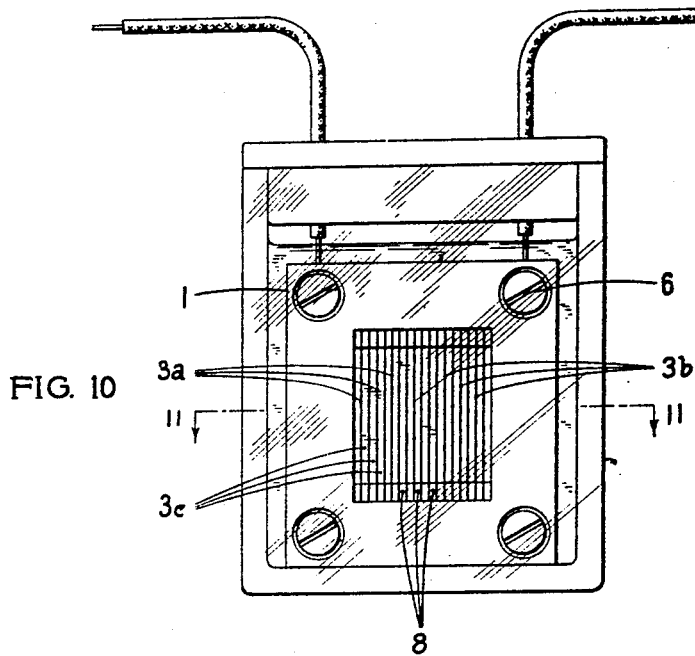
Fig. 10 is a front elevational view of an electro-optic cell, the elements illustrated in Fig. 1 to Fig. 5, inclusive, being shown as assembled in a glass cell containing a liquid dielectric.
Figure 11:
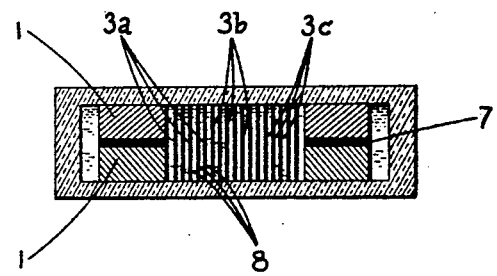
Fig. 11 is a section on the line 11—11 of Fig. 10, looking in the direction of the arrows.

A method of recording sounds for subsequent reproduction wherein an electro-optic cell is utilized is shown diagrammatically in Fig. 9, wherein light from a source S is converged by a condenser $L^1$, passes through a polarizer $N^1$, is rendered parallel by the collimator $L^2$, passes through the electro-optic cell K, is condensed by $L^3$, passes through an analyzer $N^2$, and is again converged by a condenser $L^4$ and passes on to a recording receptor R. This arrangement allows of the use of small nicols and gives good transmission.

It will be apparent from the detailed description of the preferred embodiment of the invention as described above that an electro-optic cell is provided which is highly sensitive to impressed differences of potential, and that a beam of light of large cross section may be readily accommodated and divided into a plurality of adjacent segments, the total area of which is substantially the same as the cross sectional area of the beam of light initially entering the cell. By thus dividing the cell into a plurality of active spaces of relatively narrow width the desired effect is obtained by the use of a relatively small potential difference compared to what has been required by cells heretofore used. While the invention has been described in connection with the preferred embodiment of the invention it will be obvious to those skilled in the art that various changes within the scope of the appended claims may be made.

What I claim is:

1. An electrode for an electro-optic cell comprising a frame having an opening comprising the active space thereof and a plurality of flexible ribbon like division members dividing the opening into a plurality of light passages, said flexible ribbon like members being secured to said frame and held taut across said opening.

2. An electrode for an electro-optic cell comprising a frame having an opening comprising the active space thereof and a plurality of parallel flexible ribbon like division members dividing the opening into a plurality of light passages, said parallel flexible ribbon like members being secured to said frame and held taut across said opening.

3. An eletrode for an electro-optic cell comprising a frame having an opening comprising the active space thereof and a plurality of flexible division members dividing the opening into a plurality of light passages, said flexible members being secured to said frame and held taut across said opening.

4. An electrode for an electro-optic cell comprising a frame having an opening comprising the active space thereof and a plurality of parallel flexible division members dividing the opening into a plurality of light passages, said parallel flexible members being secured to said frame and held taut across said opening.

5. An electro-optic cell comprising a plurality of electrodes, each electrode comprising a frame having an opening therethrough, the openings in said frames being in at least partial alignment and with the aligned portions forming the active space of the cell, and a plurality of division members dividing the active space into a plurality of light passages, said division members being spaced apart to form a condenser.

6. An electro-optic cell comprising a plurality of electrodes, each electrode comprising a frame having an opening therethrough, the openings in said frames being in at least partial alignment with the aligned portions forming the active space of the cell, and a plurality of thin, flat, parallel division members dividing the active space into a plurality of light passages, said division members being spaced apart to form a condenser.

7. An electro-optic cell comprising a plurality of electrodes, each electrode comprising a frame having an opening therethrough, the openings in said frames being in at least partial alignment with the aligned portions forming the active space of the cell, and a plurality of thin, flat, parallel division members secured to each frame and dividing the active space into a plurality of light passages, the division members of one electrode being laterally spaced with respect to the division members of another electrode.

8. An electro-optic cell comprising a plurality of electrodes, each electrode comprising a frame having an opening therethrough, the openings in said frames being in at least partial alignment with the aligned portions forming the active space of the cell, and a plurality of division members secured to each frame and dividing the active space into a plurality of parallel light passages, the division members of one electrode being laterally spaced with respect to the division members of the other electrode.

9. An electro-optic cell comprising a composite electrode involving a frame supporting at its opposite ends and in spaced relation a plurality of electrode elements, a second composite electrode complementary to the first electrode, means to hold the two complementary electrodes in spaced relation, and means to electrically insulate said two sets of electrodes.

10. An electro-optic cell comprising a composite electrode involving a plurality of electrode elements supported at their opposite ends and in spaced relation by a frame, a second composite electrode complementary to the first electrode, means to hold the two complementary electrodes in spaced relation, and means to electrically insulate said two sets of electrodes.

In testimony whereof I affix my signature.
NOEL DEISCH.